Nov. 18, 1969     K. F. DREXLER     3,479,543

COMPOUND EXCITATION SYSTEM

Filed Dec. 11, 1967     3 Sheets-Sheet 1

INVENTOR:
KARL F. DREXLER,

BY *W. C. Crutcher*

HIS ATTORNEY.

Nov. 18, 1969   K. F. DREXLER   3,479,543
COMPOUND EXCITATION SYSTEM
Filed Dec. 11, 1967   3 Sheets-Sheet 2
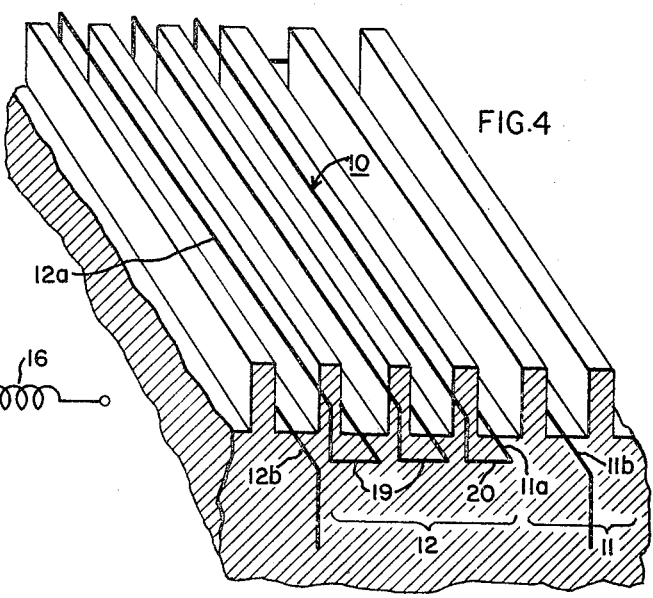
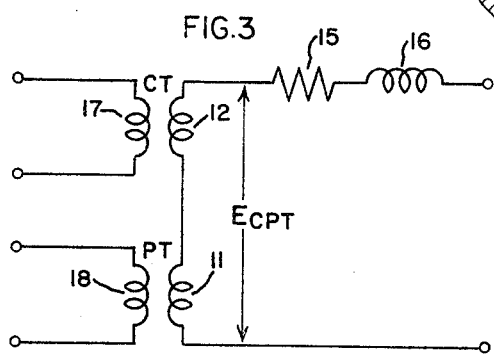
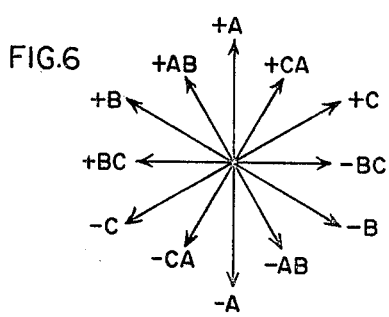
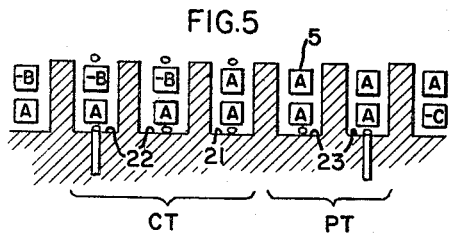
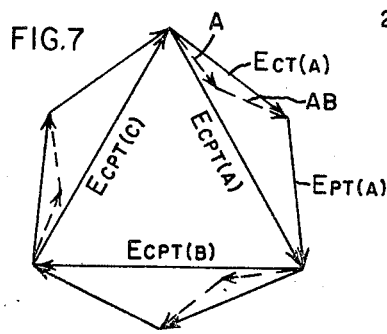
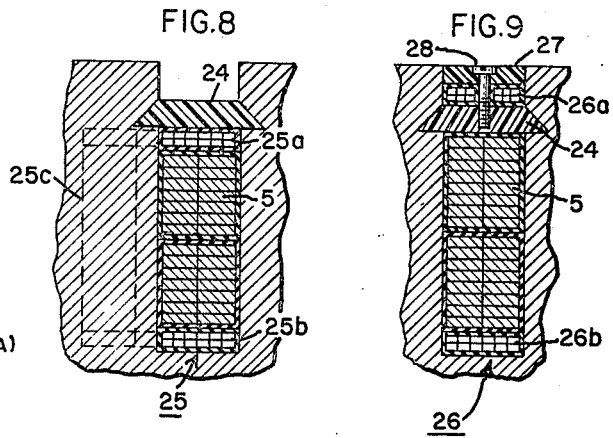
INVENTOR:
KARL F. DREXLER,
BY W. C. Crutcher
HIS ATTORNEY.

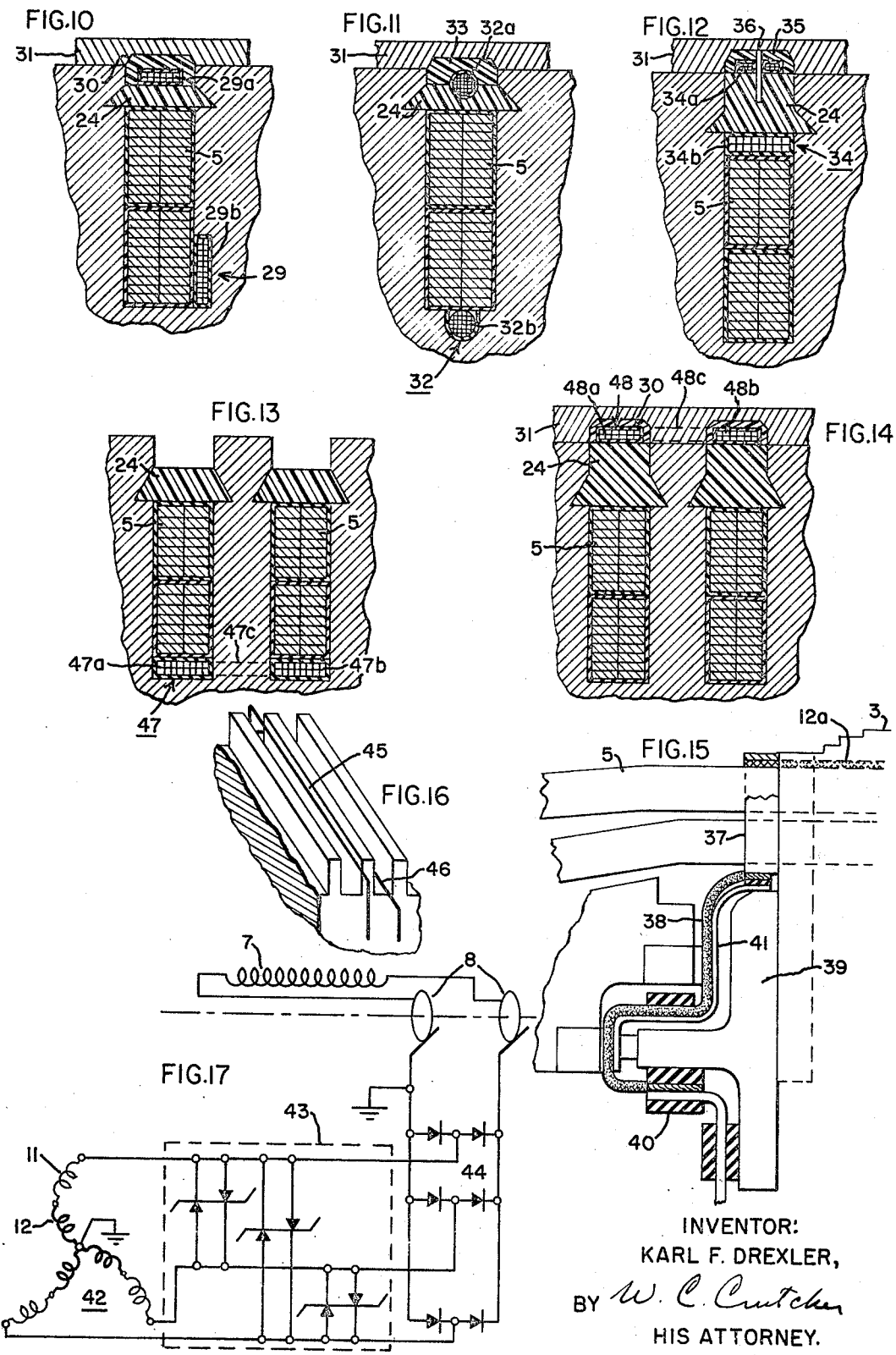

United States Patent Office 3,479,543
Patented Nov. 18, 1969

3,479,543
COMPOUND EXCITATION SYSTEM
Karl F. Drexler, Burnt Hills, N.Y., assignor to General Electric Company, a corporation of New York
Filed Dec. 11, 1967, Ser. No. 689,601
Int. Cl. H02k *19/00, 19/26*
U.S. Cl. 310—162         7 Claims

ABSTRACT OF THE DISCLOSURE

A static excitation system for a self-excited genera'or having a compound excitation winding which is self-contained within the generator. The winding has a one portion disposed to link with the armature current-responsive leakage flux and another portion disposed to link with the field current-responsive synchronous rotor flux.

BACKGROUND OF THE INVENTION

Figure 1:
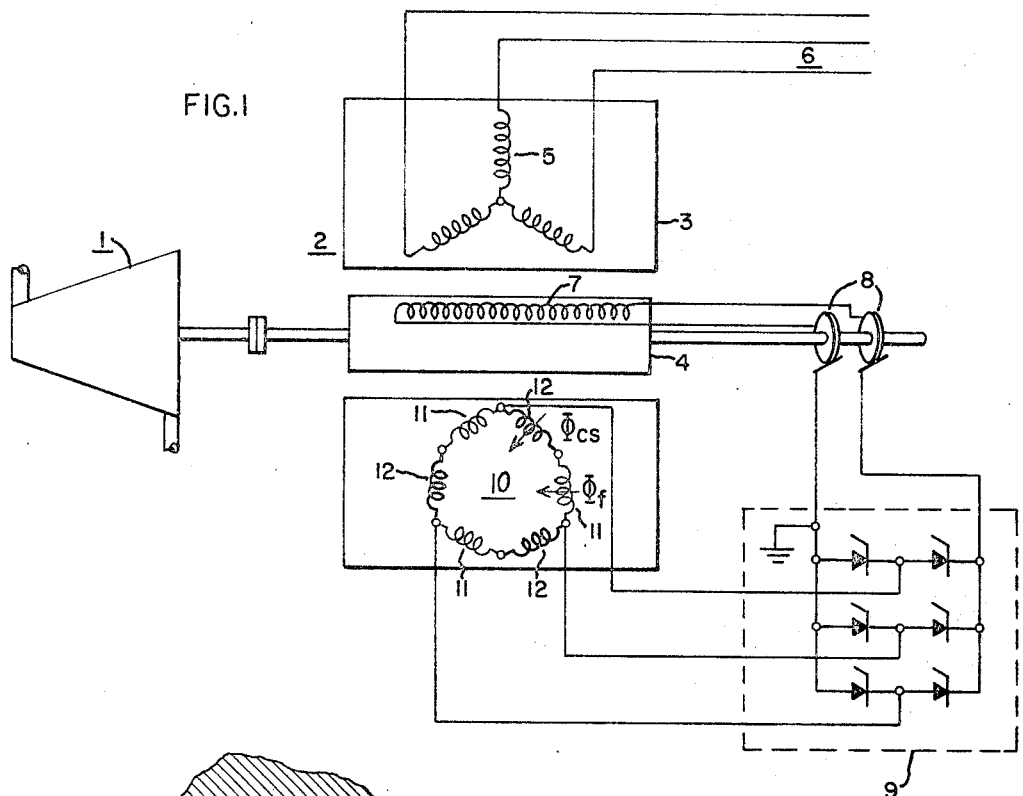

Various arrangements have been described in the prior art for providing DC excitation power to the rotating field of a synchronous machine. One class of such excitation systems is termed a static excitation system of the self-excited type. In this system, stationary transformer windings associated with the main output lines from the generator produce AC excitation power which is then rectified and supplied to the rotating field.

Improved response and self-regulation can be obtained by "compounding" the excitation windings, so that the excitation voltage is responsive both to generator output load current and to main generator output voltage. The latter is, in turn, dependent upon the rotor-produced synchronous flux which is dependent upon the rotor field current. Exemplary of such compound static excitation systems are U.S. Patent 2,208,416, Friedländer et al., and 2,454,582, Thompson et al.

One of the problems associated with such prior art static excitation systems is the cost and space requirements for the transformers external to the generator, these units often being called a current transformer (CT) and a potentiol transformer (PT). Another disadvantage, wherein the excitation transformers are located external to the generator so as to be energized from the main output leads, is that the main armature windings themselves internal to the generator must be of a larger rating in order to supply the additional incremental power required to excite the machine. This, in turn, causes additional heating with additional internal cooling problems.

Still another disadvantage of the externally located excitation transformer is its arrangement between the main output terminals of the generator and the low-voltage input terminals of the main power transformer. These isolated phase buses must be of high integrity, since any electrical fault in this area could cause great damage.

It has been suggested that auxiliary internal excitation windings might be employed in synchronous machines, either in the end turn region, as in French Patent 1,050,-847, or disposed in the winding slots themselves, as suggested in U.S. Patent 3,132,296, Nippes. However, the arrangements thus shown have provided excitation power responsive only to rotor field produced flux or a harmonic thereof and have not provided the compounding features of prior art externally disposed static excitation transformers. In other words, such arrangements have been primarily responsive to changes in generator output voltage, i.e., the PT function of the prior art.

A well-known phenomenon in large synchronous machines is the stray or leakage flux produced by the current flowing in the armature windings themselves. This occurs across the slots as cross-slot leakage flux and also in the end turn region. Cross-slot leakage flux generally causes problems such as circulating currents due to non-uniform flux density and extra strand losses which accomplish no useful result and cause extra heating. The present invention employs the leakage flux to provide a useful result.

Accordingly, one object of the present invention is to provide an improved compound static excitation system wherein windings for the excitation power are self-contained within the self-excited synchronous machine.

Another object of the invention is to provide an improved compound static excitation winding which is disposed in the slots of a synchronous machine stator core and responsive to both rotor field current (output voltage) and armature current (output current).

Another object of the invention is to provide an improved static excitation winding having a winding portion disposed to utilize cross-slot leakage flux to assist in developing an excitation voltage responsive to generator output current.

DRAWINGS

Figure 2:
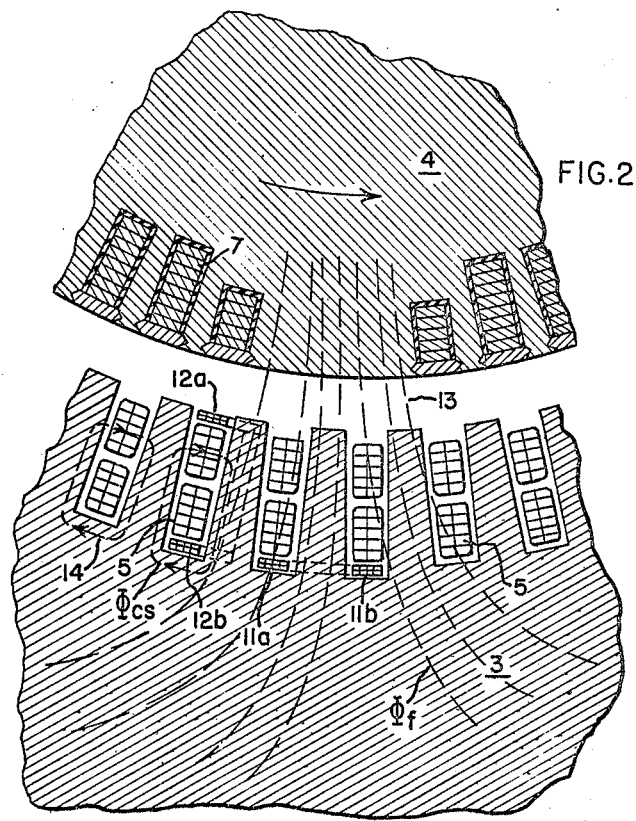

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawings in which:

FIG. 1 is a simplified schematic view of a turbine-generator self-excited by a compound static excitation system according to the invention, FIG. 2 is a simplified cross sectional view through a portion of the generator rotor and stator in the vicinity of the air gap, FIG. 3 is a single phase equivalent circuit of the exciter winding portion shown in FIG. 2, FIG. 4 and FIG. 5 are isometric and cross sectional views respectively of a simplified arrangement of compound excitation winding for one phase belt.

FIG. 6 is a vector diagram of the voltages generated by the cross-slot leakage flux linking the phase belts of a three-phase synchronous generator, FIG. 7 is a voltage vector diagram of a 3-phase internal excitation winding, FIGS. 8–14 show various arrangements of placement of excitation windings in the slot, FIG. 15 is a longitudinal view of an end winding arrangement for the excitation winding; and FIG. 16 is an alternate arrangement of excitation winding.

FIG. 17 is an alternate form of excitation system phase arrangement.

SUMMARY OF THE INVENTION

Briefly stated, the invention is practiced by disposing compound excitation windings within the generator. One portion of the winding is disposed so as to link the leakage flux produced by the main armature current. This can comprise a coil with radially spaced coil sides disposed in a slot. Another portion of the winding is disposed so as to link the rotating synchronous rotor flux. This can be accomplished by one or more coils with circumferentially spaced coil sides in adjacent slots. The two winding portions are connected in series and the AC power therefrom is led outside the generator, rectified and supplied to the rotating field windings.

DESCRIPTION OF THE PREFERRED EMBODIMENT OF THE INVENTION

Referring now to FIG. 1 of the drawing, a turbine 1 drives a generator 2 having a stationary stator core 3 and a rotor 4. Disposed in the stator core is a main armature winding 5 supplying 3-phase power to main leads 6. A field winding 7 on rotor 4, usually wound to produce two or four rotor poles in the case of a turbine-generator, is supplied with DC excitation power via collector rings 8 supplied from a silicon controlled rectifier bank 9. It will be understood to those skilled in the art that the SCR bank can be suitably controlled to trim or adjust the excitation voltage.

In accordance with the preferred form of the invention, three-phase excitation power is supplied to SCR bank 9 from an internal auxiliary excitation winding 10. Each leg of the delta-connected winding 10 includes two series connected portions 11, 12. Winding portion 11 is disposed so as to link a portion of the rotating rotor field flux $\Phi_f$. Winding portion 12 is disposed in a different orientation so as to link a portion of the cross-slot leakage flux $\Phi_{cs}$.

Referring now to FIG. 2 of the drawing, the physical arrangement of a typical generator cross section in the vicinity of the air gap is seen. The rotor winding 7 in conjunction with the rotor body produces a rotor field flux shown as lines 13 which rotate synchronously with the rotor to generate alternating current in the main stator armature windings 5. The current in armature windings 5 in turn produces a cross-slot leakage flux indicated symbolically by flux lines 14. The cross-slot leakage flux is nonuniform, i.e., increases in intensity from the bottom of the bottom bar to the top of the top bar as is well known in the art.

In accordance with the simplest form of the invention, the winding portion 11 has coil sides 11a, 11b which are circumferentially spaced from one another in the stator as, for example, lying in the bottom of adjacent slots. Coil 11 is linked by the time-varying flux produced by the rotor field in the tooth between coil sides 11a and 11b.

Winding portion 12 has coil sides 12a, 12b arranged to link the cross-slot leakage flux by virtue of being radially spaced from one another, these being shown as disposed above and below the main winding coil sides 5 in a single slot. As will be discussed later, it will usually prove advantageous from a design standpoint to have several coils making up winding portion 12 in a number of adjacent slots connected to a single coil making up winding portion 11, although this may vary considerably with the design of the synchronous machine.

FIG. 3 illustrates a single phase equivalent circuit. Winding portions 11, 12 are connected in series as shown, their combined resistance and reactance being schematically illustrated at 15 and 16 respectively. A voltage $E_{CT}$ is induced by main generator output current flowing through an equivalent or hypothetical primary winding 17 representative of the linkage of the cross-slot leakage flux with the winding 12. Hence the equivalent transformer is analogous to the previously known external CT or current transformer of the prior art.

Similarly, rotor field current flows through a hypothetical primary winding 18 which is representative of the synchronous rotor flux permeating the stator tooth between two adjacent slots. This equivalent transformer produces a voltage component $E_{PT}$, so termed because its function is the same as the previously known external PT or potential transformer. The two voltages add to produce $E_{CPT}$ which is the compounding or self-regulating excitation voltage equivalent to that obtained in the prior art with external static excitation systems.

FIG. 4 is an isometric view of a number of adjacent stator slots but omitting the main armature windings. There it is seen that the excitation winding 10, in actual practice, can comprise several separate coils extending over a group of slots and connected by jumpers 19 at the ends of the slots. Winding 12 is then connected in series by jumper 20 to winding 11, which is a single coil lying in the bottom of two adjacent slots.

FIG. 5 shows a cross section of FIG. 4 with coil sides of the main winding 5 in place. Here it is noted that, in a three-phase machine, the three phases A, B and C commonly result in overlapping phase belts. The vector diagram of FIG. 6 illustrates that the EMF generated due to cross-slot flux in slots containing phase A and B coil sides is of a different phase and magnitude from slots containing two of the phase A coil sides. Hence due consideration must be taken in the placement of the excitation winding 10.

FIG. 7 is a voltage vector diagram showing the voltages generated in a three-phase excitation winding which consists of three windings such as the one disclosed in FIG. 4 connected in delta as shown in FIG. 1. Vector A represents the voltage generated due to cross-slot flux in slot 21 of FIG. 5. Vector AB represents the voltage generated due to cross-slot flux in slots 22 of FIG. 5. Combined vectorially, these produce voltage vector $E_{CT(A)}$ which is a voltage responsive to armature current.

Vector $E_{PT(A)}$ is the voltage generated by the winding portion 11 in slots 23 of FIG. 5. This voltage is responsive to rotor field current or flux and, when added vectorially to the aforesaid current responsive vector $E_{CT(A)}$, renders a combined compound and self-regulating excitation voltage $E_{CPT(A)}$. A similar analysis holds for phases B and C.

Referring to FIGS. 8–14 of the drawing, a number of typical arrangements may be seen for physical dispositions of the excitation windings in the slot along with the regular windings.

The arrangements shown in FIGS. 8–12 are primarily of interest with respect to placement of coil sides for winding portion 12 which links the cross-slot leakage flux. Winding portion 12 in its preferred form consists of several coils, each having two radially spaced coil sides along a slot. Therefore, a number of variations are indicated in the figures. In FIGS. 8–14, it will be understood that the top or open part of the slot is the radially innermost portion with respect to the machine axis, while the bottom of the slot is radially outermost.

In FIG. 8, a known slot arrangement comprises main winding coil sides 5 held in place by a dovetailed wedge 24 in the stator core 3. In addition, however, a separate excitation coil 25 lies in the same slot. The top or radially innermost coil side 25a is disposed just below the wedge 24. The other coil side 25b of the excitation coil 25 is shown in the bottom of the slot beneath the main winding 5. A jumper 25c at the end of the slot connects the coil sides without interference with the main winding 5. Jumpers are omitted from the remaining FIGURES 9–12 so as not to obscure the drawings.

It should be particularly noted that the excitation coil 25 is a separate entity from the main armature winding 5 and has its separate ground insulation. This may be lighter insulation than the main winding since it does not carry high voltage. Preferably, it is stranded as shown and is also transported in one of the manners previously known in the prior art for use in main windings. Cooling may also be provided, if desired, in one of the known schemes for main windings.

FIG. 9 is an arrangement to provide additional radial spacing between the excitation winding coil sides, since the voltage generated in the excitation winding is partly a function of the radial spacing between portions. Here the radially inner portion 26a of the winding 26 is disposed on top of wedge 24 and held in place by a slot strip 27. Strip 27 is, in turn, secured to wedge 24 by spaced insulated screws 28.

FIG. 10 illustrates an arrangement which does not utilize additional slot space. The radially outer portion 29b of the excitation winding 29 is disposed along the side of the main slot in a supplementary side slot cut in the laminations. The radially inner portion 29a is disposed above wedge 24 and held in place by a channel shaped strip 30 extending along the slot. Strip 30 is, in turn, held in place by longitudinally spaced rings 31 extending into the air gap.

The excitation winding need not be rectangular in cross-section. FIG. 11 shows an alternate arrangement which is especially useful for proving transposition of the excitation winding. Here the excitation winding 32 is arranged in the form of an insulated cable with twisted strands. The radially outer portion 32b lies in a cutout in the bottom of the slot and the radially inner portion 32a is held by channel shaped member 33 extending along the slot and ring 31 as before.

Since it may be advantageous to be able to remove the excitation winding without disturbing the main winding 5, FIG. 12 illustrates an excitation winding 34 having a radically outer portion 34b which goes beneath the wedge 24 and a radially inner portion 34a held by longitudinal channel 35 and ring 31 as before. A locating dowel 36 provides alignment.

The arrangements shown in FIGS. 13 and 14 are of interest with respect to winding portion 11 which links the main rotor flux.

Referring to FIG. 13, main coil sides 5 are shown for two adjacent slots held in place by wedges 24. The excitation winding 47 is a separate insulated stranded winding with two coil sides 47a, 47b disposed in the bottom of two adjacent slots beneath the coil sides 5, and connected by a suitable jumper 47c outside of the slot.

FIG. 14 is a similar arrangement which permits access to the excitation winding without removing the main windings 5. Here the excitation coil 48 includes coil sides 48a, 48b connected by jumper 48c. The coil sides are held in place by an arrangement similar to FIG. 10 using channel strips 30 and rings 31.

FIG. 15 shows a typical end winding arrangement for the excitation winding. The main armature windings 5 are seen emerging from slots in the stator core 3. An excitation winding coil side 12a lying in the top of the slot is connected by means of a jumper 37 around the main windings 5 to a lead member 38. Insulated lead 38 is supported by the generator end flange 39 by means of insulated supports 40 and a metal flux shield 41. Lead 38, along with similar leads from other excitation windings, are appropriately connected to buses (not shown), which are then connected to the external rectifier bank outside the generator casing. These require the usual seals in order to be led out of the gas filled casing common to large generators.

Although it is contemplated that the most satisfactory form of the present invention will include at least a pair of circumferentially displaced coil sides for winding portion 11 and at least a pair of radially spaced coil sides for the winding portion 12, and usually several pairs of the latter, it should be pointed out that it is within the purview of the present invention in its most general form to generate a compound excitation voltage with only a single coil. Such an arrangement is illustrated in FIG. 16 wherein one coil side 45 is located in the top of one slot and connected to the other coil side which is disposed to lie in the bottom of an adjacent slot. Therefore, it will be apparent that coil sides 45, 46 generate a compound voltage which is influenced not only by the rotor field flux because of their circumferential spacing, but also by the cross-slot leakage flux because of their radial spacing.

FIG. 17 illustrates an alternate connection of three phase excitation leads which may be suitable for some applications. Here the rotor field current-responsive winding portions 11 and the armature current-responsive winding portions 12 are connected in series as each leg of a Y-connected excitation winding. An SCR regulator bank 43 is interposed between winding 42 and an external diode rectifier bank 44 to provide trimming adjustments and minor regulation by means known to those skilled in the art.

Operation

The operation of the invention can best be seen by reference to FIG. 2. As to winding portion 11, it will be seen that coil sides 11a, 11b link the part of the main rotor field flux lines 13 which permeates the stator tooth between them. This time-varying flux is dependent upon rotor field current and hence the voltage generated in winding portion 11 will correspond to main generator output voltage which is also dependent upon the rotor field current.

Referring to the winding portion 12, the coil sides 12a and 12b link the cross-slot leakage flux lines 14. This flux field is time varying also in a sinusoidal manner, since it depends upon the armature current in the primary winding 5. Therefore, an EMF is induced in the winding portion 12 which is responsive to armature current.

Advantages

From an overall systems viewpoint, the operation of my improved excitation winding under varying generator load is essentially the same as prior known compound static excitation systems, in that it has inherently fast-responding and self-regulating features. This, of course, is due to the provision of two separate winding portions 11, 12, one of which is responsive to variations in generator output voltage, i.e., rotor field current, and the other of which is responsive to variations in generator output current. The overall system excitation characteristics of my improved static excitation winding are not elaborated upon, therefore, inasmuch as they will be familiar to those knowledgeable as to prior systems having PT and CT external windings or transformers associated with the main leads. However, my invention does not require space-consuming and expensive external tranformers, since the excitation power is generated through supplementary internal windings by direct linkage with the main field flux and direct linkage with armature current leakage flux.

In addition to the elimination of the transformers in known static excitation systems, the invention of course has all of the advantages of static systems in general, in that it requires no extra rotating exciter which is subject to mechanical failure.

Although both winding portions 11, 12 have been shown in the preferred embodiment as disposed in or along the stator slots, other arrangements are possible. Depending on the arrangement of armature windings in the end turns, the armature current produced leakage flux in the end turn region could be employed to activate a suitably disposed winding portion similar to winding portion 12.

Similarly, the winding portion 11 linking the main rotor flux could be arranged in the air gap between the slots. It could also be disposed externally to the generator as a voltage-responsive transformer (PT) and connected to a slot-lying portion 12 linked with cross-slot leakage flux as before.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

What I claim as new and desire to secure by Letters Patent of the United States is:

1. An excitation source for a synchronous dynamoelectric machine of the type having a main armature winding disposed in a stationary slotted core and having a rotating field winding, comprising:
a first stationary winding portion disposed inside the dynamoelectric machine so as to link a portion of the synchronous flux produced by the rotating field winding, said first winding portion including a coil having coil sides disposed in circumferentially spaced slots, and a second stationary winding portion disposed in the dynamoelectric machine so as to link a portion of the leakage flux produced by current in the main armature winding, said first and second winding portions being operatively connected to provide a compound static excitation source.

2. The combination according to claim 1, wherein said second winding portion comprises a coil having radially spaced coil sides disposed in a common stator slot.

3. The combination according to claim 1, wherein said first winding portion includes coil sides disposed in circumferentially spaced adjacent slots and wherein said second winding portion includes a plurality of coils each having radially spaced coil sides disposed in a common slot, said first and second winding portions and said coils being connected together in series by jumpers at the ends of the stator core.

4. An excitation source for a synchronous dynamoelectric machine of the type having a main armature winding disposed in a stationary slotted core and having a rotating field winding, comprising an excitation winding portion comprising a coil having coil sides disposed in a common slot along with part of said main armature winding and arranged to link the cross-slot leakage flux produced by said main winding.

5. The combination according to claim 4 wherein said coil sides are disposed in the top and bottom of the slot with the main winding disposed between them.

6. The combination according to claim 4 wherein said coil sides are both disposed in the top of the slot above the main winding and radially separated by wedge means arranged to also hold the main winding in place.

7. An excitation source for a synchronous dynamoelectric machine of the type having a main armature winding disposed in a stationary slotted core and having a rotating field winding, comprising a winding disposed in said core slots and having coil sides oriented to link a portion of the leakage flux produced by current in the main armature winding and also to link a portion of the synchronous flux produced by the rotating field winding, whereby an EMF is induced in said winding which is responsive to both field current and armature current.

References Cited

UNITED STATES PATENTS

| | | | |
|---|---|---|---|
| 3,132,296 | 5/1964 | Nippes | 322—58 |
| 2,454,582 | 11/1948 | Thompson | 322—60 |
| 2,208,416 | 3/1940 | Friedlander | 322—21 |
| 2,165,976 | 7/1939 | Mandl | 322—59 |
| 2,568,407 | 9/1951 | Pattison | 322—73 |
| 2,679,605 | 5/1954 | Kilgore | 310—179 |
| 2,796,580 | 6/1957 | Maggs | 310—184 |
| 2,897,383 | 7/1959 | Barrows | 310—68.4 |
| 3,032,700 | 5/1962 | Cecil | 322—73 |
| 3,034,035 | 5/1962 | Baumann | 310—68.4 |
| 3,351,845 | 11/1967 | Roof | 322—59 |

FOREIGN PATENTS 1,050,847    1954    France.

MILTON O. HIRSHFIELD, Primary Examiner

R. SKUDY, Assistant Examiner

U.S. Cl. X.R.

310—180